United States Patent
Jacklin et al.

(10) Patent No.: US 10,324,160 B2
(45) Date of Patent: Jun. 18, 2019

(54) GEOLOCATION OF BEYOND LOS HF EMITTERS

(71) Applicant: Northrop Grumman Systems Corporation, Falls Church, VA (US)

(72) Inventors: Neil A. Jacklin, Antelope, CA (US); Gregory P. Richards, Durham, NC (US); Joshua Markow, Bedford, NH (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 699 days.

(21) Appl. No.: 15/000,498

(22) Filed: Jan. 19, 2016

(65) Prior Publication Data

US 2017/0205492 A1    Jul. 20, 2017

(51) Int. Cl.
  *G01S 5/02*     (2010.01)
  *G01S 5/06*     (2006.01)

(52) U.S. Cl.
  CPC ............ *G01S 5/0273* (2013.01); *G01S 5/06* (2013.01)

(58) Field of Classification Search
  CPC ..... G01S 3/02; G01S 5/02; G01S 5/12; G01S 5/06; G01S 5/0273; G01S 5/0252; G01S 13/003; G01S 13/878
  USPC ....................................................... 342/453
  See application file for complete search history.

(56) References Cited

U.S. PATENT DOCUMENTS

| | | | | | |
|---|---|---|---|---|---|
| 5,444,451 | A | * | 8/1995 | Johnson | .................... G01S 3/46 342/378 |
| 6,040,798 | A | * | 3/2000 | Kinal | .................... G01S 5/0009 342/352 |
| 7,031,730 | B1 | * | 4/2006 | Barber | .................... G01S 19/07 342/357.23 |
| 2004/0027276 | A1 | * | 2/2004 | Herman | .................... G01S 5/06 342/181 |
| 2012/0021687 | A1 | * | 1/2012 | Parker | .................. H01Q 3/2611 455/63.1 |
| 2014/0002302 | A1 | * | 1/2014 | Robinson | ................ G01S 19/02 342/357.32 |
| 2016/0011318 | A1 | * | 1/2016 | Cohen | .................... G01S 19/05 342/357.26 |
| 2017/0003376 | A1 | * | 1/2017 | Wellman | ............... G01S 5/0221 |

OTHER PUBLICATIONS

Stein, S., "Algorithms for Ambiguity Processing," IEEE Trans. on Acoustics, Speech, and Signal Proc., vol. 29, No. 3, Jun. 1981, all enclosed pages cited.

(Continued)

*Primary Examiner* — Harry K Liu
(74) *Attorney, Agent, or Firm* — Burr Forman McNair

(57) ABSTRACT

An apparatus having processing circuitry configured to estimate beyond line-of-sight emitter location may be configured to receive signal information indicative of TDOA and FDOA measurements at a first receiver and a second receiver. The signal information may be generated based on indirect wave signals received from the emitter at each of the first and second receivers. The processing circuitry may be further configured to employ a first analytical model of the ionosphere to generate coarse TDOA and FDOA contour maps, and generate a first geolocation estimate based on the coarse TDOA and FDOA contour maps.

19 Claims, 8 Drawing Sheets

(56) References Cited

OTHER PUBLICATIONS

Carroll, L., et al., "Timing via the new LORAN-C system," Proc. 2003 IEEE Int'l Frequency Control Symposium and PDA Exhibition Jointly with the 17th European Frequency and Time Forum, May 2003, all enclosed pages cited.

Mikhalev, A., et al., "Passive Emitter Geolocation Using Agent-based Data Fusion of AOA, TDOA and FDOA Measurements," 10th Int'l Conf. on Info. Fusion, 2007, all enclosed pages cited.

\* cited by examiner though there may be relatively reliable mechanisms to perform geolocation on direct wave signals, even this form of geolocation is somewhat questionable when it is not clear whether the emitter is providing direct wave or sky wave signals to the receiver.
GEOLOCATION OF BEYOND LOS HF EMITTERS

TECHNICAL FIELD

Example embodiments generally relate to geolocation techniques and, in particular, relate to a method and system for performing geolocation relative to contacts that are beyond the line-of-sight (LOS) using time-difference-of-arrival (TDOA) and frequency-difference-of-arrival (FDOA) measurements.

BACKGROUND

HF geolocation is challenging compared to VHF or UHF geo-location due to the fact that HF signals refract off the ionosphere. The refracted HF signal, called a sky wave, behaves in a way that means the employment of geolocation techniques becomes significantly more complicated. Typical TDOA and FDOA geolocation techniques assume a direct LOS (direct wave) between the transmitter and the receiver. This assumption allows a line to be traced across the surface of the Earth (isochrones and/or isodops) that represents all the possible emitter locations when two spatially separated receivers measure a given TDOA or FDOA.

However, for a signal that has "bounced" off the ionosphere, the ground, or both, the assumptions and techniques employed for direct wave geolocation are invalidated. Thus, the ability to use the sky waves to perform geolocation, and therefore also the ability to determine the location of a target that is over the horizon, is currently severely limited. Moreover, even though there may be relatively reliable mechanisms to perform geolocation on direct wave signals, even this form of geolocation is somewhat questionable when it is not clear whether the emitter is providing direct wave or sky wave signals to the receiver.

Thus, the ability to use sky wave signals for geolocation would be valuable both when direct wave signals are not available, when both direct wave and sky wave signals are available, and when it is unclear as to whether a received signal is a direct wave or a sky wave.

Accordingly, it may be desirable to define ways to use sky wave signals for geolocation.

BRIEF SUMMARY OF SOME EXAMPLES

Some example embodiments may therefore provide an ability to use TDOA and FDOA measurements on sky wave signals to determine geolocation of HF emitters that are beyond LOS. Moreover, some example embodiments may be useful in performing geolocation for airborne and/or terrestrial receivers and/or emitter.

In accordance with an example embodiment, apparatus having processing circuitry configured to estimate beyond line-of-sight emitter location is provided. The processing circuitry may be configured to receive signal information indicative of TDOA and FDOA measurements at a first receiver and a second receiver. The signal information may be generated based on indirect wave signals received from the emitter at each of the first and second receivers. The processing circuitry may be further configured to employ a first analytical model of the ionosphere to generate coarse TDOA and FDOA contour maps, and generate a first geolocation estimate based on the coarse TDOA and FDOA contour maps.

In accordance with another example embodiment, an apparatus having processing circuitry configured to estimate beyond line-of-sight emitter location is provided. The processing circuitry may be configured to receive a coarse geolocation estimate of emitter location based on indirect wave signals received from the emitter at each of a first receiver and a second receiver, employ a ray tracer to further refine the coarse geolocation estimate of emitter location where the ray tracer employs an analytical model of the ionosphere, and generate a finer geolocation estimate based on operation of the ray tracer.

In accordance with still another example embodiment, an apparatus having processing circuitry configured to estimate beyond line-of-sight emitter location is provided. The processing circuitry may be configured to receive signal information indicative of TDOA and FDOA measurements at a first receiver and a second receiver. The signal information may be generated based on indirect wave signals received from the emitter at each of the first and second receivers. The processing circuitry may be further configured to employ a first analytical model of the ionosphere to generate coarse TDOA and FDOA contour maps, generate a first geolocation estimate based on the coarse TDOA and FDOA contour maps, employ a ray tracer to further refine the coarse TDOA and FDOA contour maps where the ray tracer employs a second analytical model of the ionosphere, and generate a second geolocation estimate based on operation of the ray tracer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
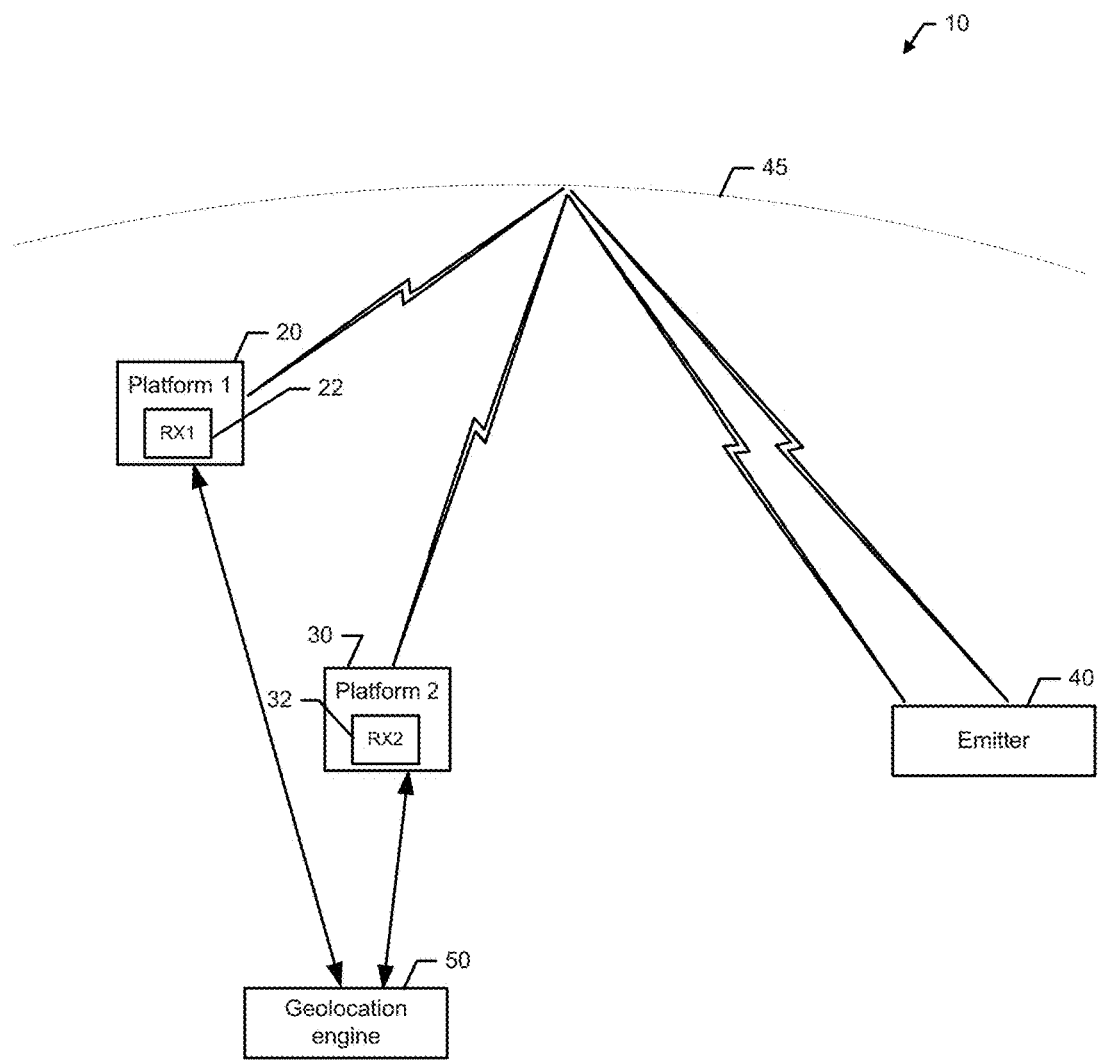
FIG. 1 illustrates a schematic diagram of a system for performing beyond LOS geolocation in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Some example embodiments may enable geolocation using sky wave signals. In this regard, for example, some embodiments may allow a model of the ionosphere to be used to determine an approximate emitter location using TDOA and FDOA on sky wave signals. Some embodiments may further perform ray tracing using the same or a different (e.g., more complex) ionospheric model along with highly parallel processing to determine the exact paths and refine the geolocation.

In an example embodiment, geolocation of emitters that are beyond LOS can be achieved by starting with a relatively simple model of the ionosphere (e.g., Chapman layer or stratified ionosphere model) to determine an approximate emitter location based on sky wave signals with TDOA and FDOA measurements. Thereafter, ray tracing using a more complex model (e.g., a full three dimensional ionospheric model such as, either the GAIM model or the IRI model, or a model enriched with ionospheric measurements) and highly parallel processing may be employed to determine the exact paths and refine the geolocation.

FIG. 1 illustrates a schematic diagram of a system 10 for performing beyond LOS geolocation in accordance with an example embodiment. The system 10 may include a first platform 20 having a first receiver 22 (RX1) thereon and a second platform 30 having a second receiver 32 (RX 2) thereon. The first and second platforms 20 and 30 may be mobile or fixed platforms that are either on the ground, or are at altitude (i.e., airborne). The first and second receivers 22 and 32 may each receive HF-band waves or signals from an emitter 40. The HF-band waves or signals (e.g., HF signals) may be direct waves or sky waves 42. Direct waves may proceed directly from the emitter 40 to the first and/or second receivers 22 and 32, and thus may necessarily allow a direct LOS between the first and second platforms 20 and 30 and the emitter 40. However, sky waves 42 may "bounce" off the ionosphere 45 of the earth, and therefore can travel over the horizon and beyond LOS. Sky waves 42 may generally be referred to as indirect waves, and indirect waves may include any waves that are not direct waves (e.g., including waves that bounce off the earth) regardless of the medium off which the indirect waves bounce, or the number of bounces.

In an example embodiment, the first and second receivers 22 and 32 may each be configured to record signal information associated with HF signals received from the emitter. The recorded signal information may include, for example, TDOA measurements, FDOA measurements, frequency, polarization, time, and/or the like. The first and second platforms 20 and 30 may each also include additional communications equipment to enable the first and second platforms 20 and 30 to communicate wirelessly with each other and/or with another entity (e.g., ground based, or airborne) to provide the recorded signal information to the other entity. In an example embodiment, the other entity may include a geolocation engine 50 of an example embodiment.

The geolocation engine 50 may be configured to receive information from the first and second platforms 20 and 30 indicative of or otherwise including the recorded signal information. The geolocation engine 50 may then be configured to perform geolocation techniques in accordance with an example embodiment to determine an estimated location of the emitter 40.

In some example embodiments, the geolocation engine 50 may be located on one of the platforms. In other words, for example, the first platform 20 may include an instance of the geolocation engine 50 and the first platform 20 may receive the recorded signal information from the first and second receivers 22 and 32 to perform geolocation techniques based on the recorded signal information. However, in other examples, the geolocation engine 50 could be instantiated at the second platform 30, at a ground station, or at another airborne or mobile station of any type that is capable of communicating with the first and second platforms 20 and 30. Although not required, the geolocation engine 50 may receive the recorded signal information in real time, or substantially in real time and log or store the information for analysis locally at the geolocation engine 50 to determine the location of the emitter 40 substantially in real time. However, in other instances, the location of the emitter 40 may be estimated after the fact based on post hoc analysis of the recorded signal information.

FIG. 1 is not drawn to scale, and it should be appreciated that the emitter 40 may, particularly when initially detected, not be visible or have a direct LOS to the first platform 20 or the second platform 30. Thus, as can be appreciated from FIG. 1, the bouncing of the sky waves 42 off the ionosphere 45 may be the only potential path by which the first and second receivers 22 and 32 can receive HF signals from the emitter 40 in some cases. However, in other cases, direct waves may also be receivable, or it may be ambiguous as to whether received signals are direct waves or indirect waves. In any case, the geolocation engine 50 of example embodiments may be configured to execute a geolocation algorithm that determines an estimated location of the emitter 40 based on the assumption that the received signals are sky waves 42, and based on TDOA and FDOA measurements and analysis as described herein.

In some cases, other assumptions about the altitude of the emitter 40 may also be employed in execution of the geolocation algorithm. For example, the HF signal received may provide some clue or indication as to the identity or platform type of the emitter 40. The platform type or identity may further provide information for determining an assumed altitude (e.g., on the ground or at any elevation/altitude suitable for the platform indicated by the platform type or identity) of the emitter 40.

Propagation via the ionosphere breaks the traditional LOS assumption in classic TDOA/FDOA techniques and requires a different system model with different geolocation algorithms to be employed to correctly estimate the location of the emitter 40. In an example embodiment, the geolocation engine 50 may be configured to receive information indicative of TDOA and FDOA measurements made by at least two platforms (e.g., the first and second platforms 20 and 30), each equipped with a single HF-band antenna (for use with the first and second receivers 22 and 32). Thereafter, the geolocation engine 50, which may be located at one of the two platforms or at a third entity (which can be mobile or fixed, and airborne or ground-based), may be configured to perform beyond LOS geolocation based on sky wave data as described herein.

The first and second platforms 20 and 30 will be geographically separated from each other. Moreover, in practice, the geolocation engine 50 may be expected to generate more accurate results when the first and second platforms 20 and 30 are well separated. In this regard, for example, when the first and second platforms 20 and 30 have greater distances between each other, and/or have significant angular separation from each other relative to the emitter 40, the accuracy of location estimates of the emitter 40 based on the operation of the geolocation engine 50 may be improved.

In an example embodiment, the geolocation engine 50 may be configured to receive a set of TDOA and FDOA measurements from the first and second platforms 20 and 30. However, it should be appreciated that additional data from other platforms may also be included to further enhance accuracy when such data is available. The first and second receivers 22 and 32 on the first and second platforms 20 and 30 may be both time and frequency referenced. Thus, for example, all data received may be time stamped relative to an accurate reference clock.

Upon receipt of the set of TDOA and FDOA measurements, the geolocation engine 50 may apply a first analytical model of the ionosphere to provide a first (e.g., coarse) geolocation estimate. The first analytical model of the ionosphere may be a relatively simple ionospheric model such as, for example, a Chapman layer or stratified ionosphere model. The first geolocation estimate may be enabled to compute solutions over very large search areas (e.g., thousands of square kilometers) relatively quickly to identify a smaller target area (e.g., tens or hundreds of square kilometers in size). Thereafter, the geolocation engine 50 may be configured to perform a brute-force reverse ray tracing search over the smaller target area based on the coarse geolocation estimate from the first analytical model to find a higher accuracy emitter location estimate, which is both consistent with the TDOA/FDOA measurements and a high-accuracy ionosphere model (e.g., a second analytical model of the ionosphere) in the ray tracer as a second geolocation estimate, which refines the first geolocation estimate. This two-step approach may provide for efficient use of the ray tracer to quickly provide high accuracy geolocation estimates. However, in some cases, although the first and second geolocation estimates may provide more accurate location estimates when combined with each other. Each of the first and second geolocation estimates could be employed separately. In this regard, the first geolocation estimate could stand alone, and the second geolocation estimate could follow some other initial estimate of emitter location.

Figure 2:
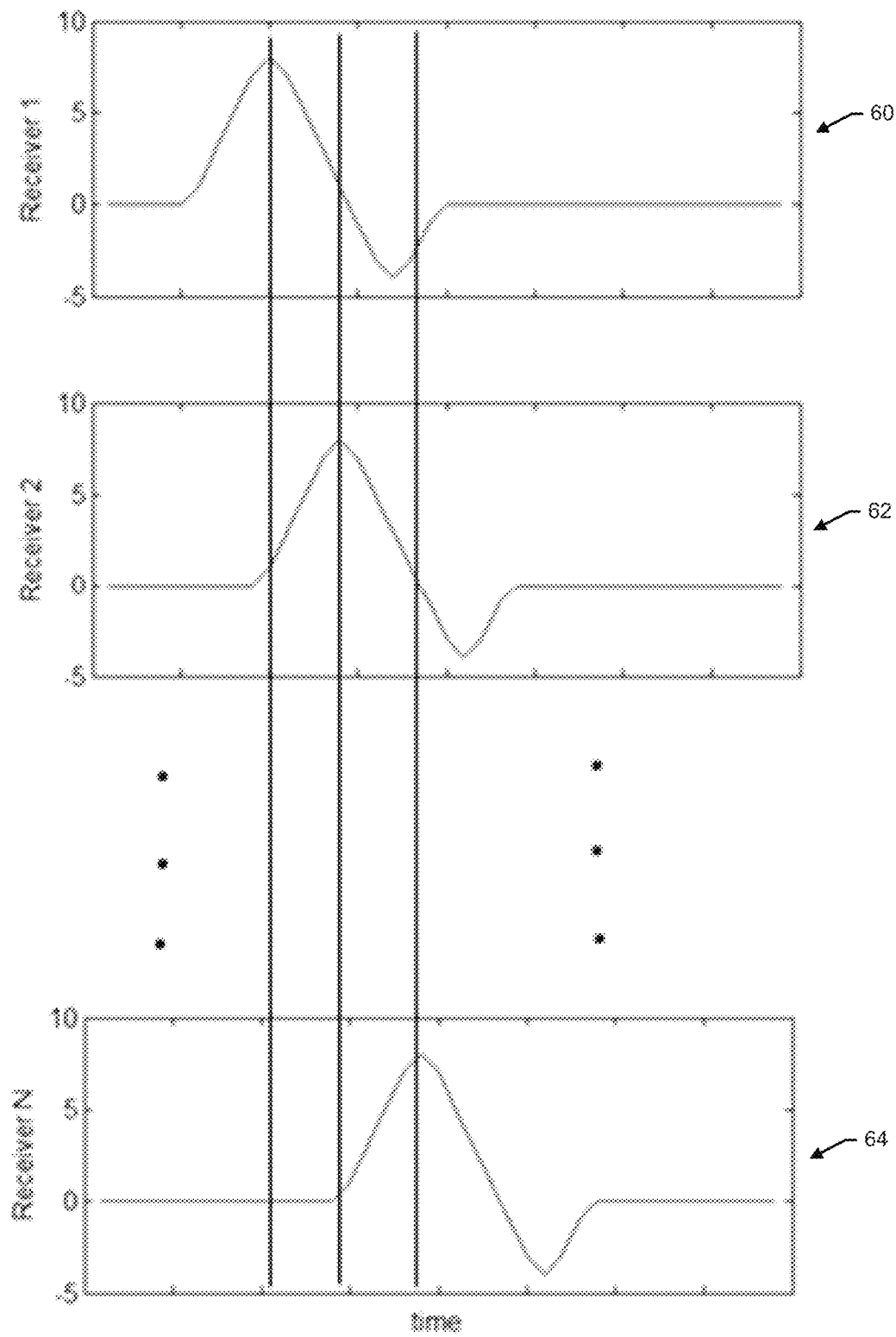
FIG. 2 illustrates a timing diagram showing signals received at different sensors to illustrate corresponding different times of arrival at the sensors according to an example embodiment.

Time difference of arrival (TDOA)- and frequency difference of arrival (FDOA)-based geolocation systems using direct waves have a long history in military and civilian applications. These systems rely on spatially separated sensors to geolocate an emitter based on the differences between the time the signal arrived at each sensor. Generally, the emitter is not cooperating with the geolocation system. For this reason, it is not possible to measure the actual time of flight between the transmitter and any sensor. However, if all sensors can have, or be assumed to have, synchronized clocks, then it is possible to measure the emitter's signal and accurately record its time of arrival (which in practice is the time of arrival of a characteristic "epoch" in the signal, such as the peak represented in FIG. 2). Referring to FIG. 2, a first received signal 60 from the first receiver 22 may be compared to a second received signal 62 received from the second receiver 32 to determine a time difference of arrival therebetween. If other receivers are included (e.g., Rx N), then an $N^{th}$ received signal 64 received from the $N^{th}$ receiver may be compared to the first received signal 60 and/or the second received signal 62 to determine a time difference of arrival therebetween.

For traditional LOS TDOA systems with receivers and emitter in the same geometric plane (i.e., flat Earth model), the contours of constant TDOA are hyperbolas. Thus, in the example of FIG. 3, the intersection of multiple hyperbolas, based on the TDOA information received, may define a location estimate for the emitter. In such a relatively simple case, the constant TDOA contours can be obtained in closed-form. However, for beyond LOS situations, an analytical model is needed in order to determine TDOA contours numerically. The analytical model must be used to account for the refraction of the signals travelling through the ionosphere.

The addition of FDOA information can be used in a similar way to TDOA for geolocation. Due to the relative motion of the receivers (e.g., the first and second receivers 22 and 32) and due to ionospheric effects, there will be a difference in the apparent frequency of the received signal at the respective receivers. The FDOA due to the motion of the receivers can be used in an analogous way to TDOA for geolocation; that is, "isodops", or contours of constant FDOA, can be drawn between pairs of receivers. Unlike TDOA contours, FDOA contours do not have a simple functional form even in the traditional LOS and planar case. However, FDOA contours can be useful for geolocation because they tend to provide better "directional" information, whereas TDOA contours provide "range" information. Thus the combination of TDOA and FDOA measurements is powerful and can reduce the minimum number of receivers needed for a geolocation from three to two.

The HF-band sky wave TDOA/FDOA-based geolocation problem requires consideration of several unique features to achieve acceptable performance. Over very long ranges (thousands of kilometers) the curvature of the Earth is non-negligible. Therefore, a spherical Earth model (instead of a flat Earth model) may be employed for the analytical model. Ionospheric transmissions may be modeled as a perfect reflection at an assumed effective ionosphere height. In an example embodiment, only a single reflection ("bounce") may be considered. The first and second receivers 22 and 32 may be located at known positions in terms of latitude, longitude, and altitude and an assumed altitude may be selected for the emitter 40. The assumed altitude may be at the surface of the Earth or at any other desired altitude. However, multiple solutions could be generated for different assumed altitudes. In some cases, for employment of the ray tracer, one of several stored ionosphere data sets may be used to evaluate system performance.

Figure 3:
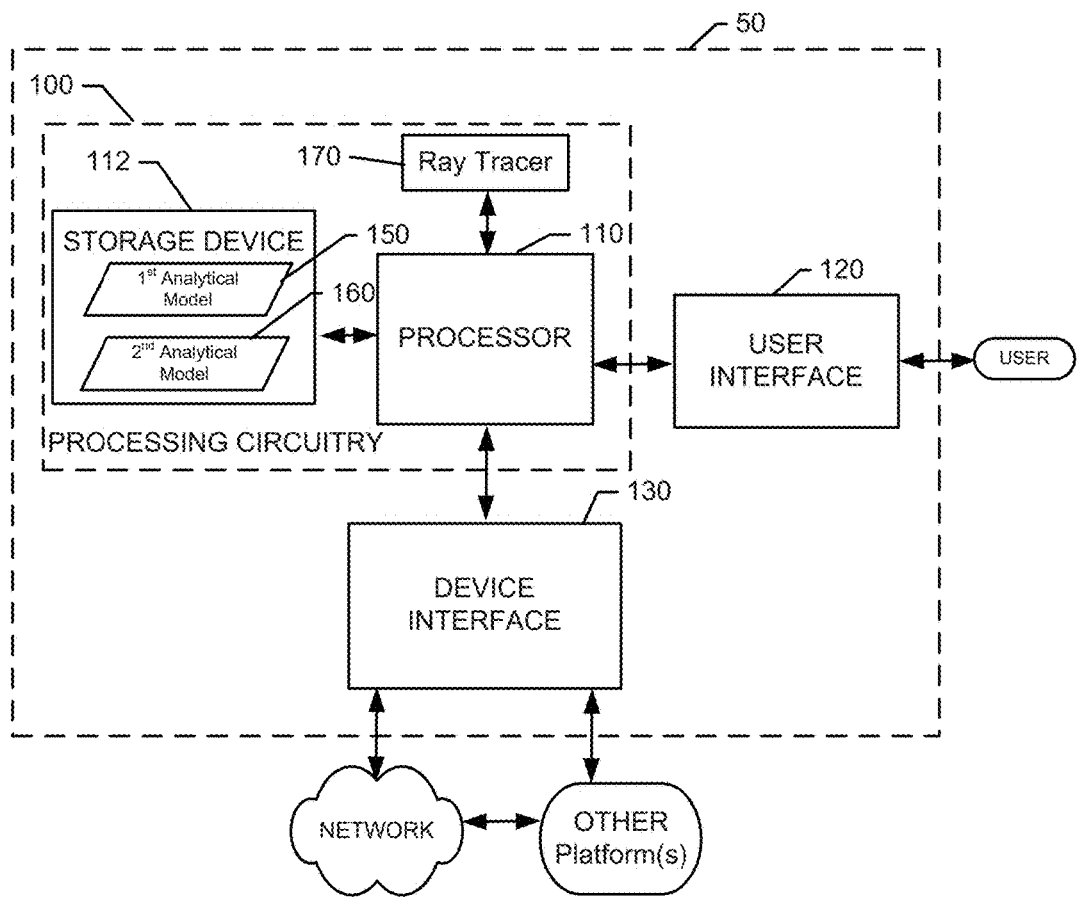
FIG. 3 illustrates a block diagram of the geolocation engine of an example embodiment.

FIG. 3 illustrates a block diagram of the geolocation engine 50 of an example embodiment. The geolocation engine 50 of FIG. 3 may be employed, for example, on the first platform 20, the second platform 30, another airborne platform capable of receiving information indicative of TDOA/FDOA measurements from the first and second platforms 20 and 30, or a ground based platform capable of receiving information indicative of TDOA/FDOA measurements from the first and second platforms 20 and 30. Alternatively, some embodiments may be employed on a combination of devices. Accordingly, some embodiments of the present invention may be embodied wholly at a single device or by devices in a client/server relationship. Furthermore, it should be noted that the devices or elements described below may not be mandatory and thus some may be omitted in certain embodiments.

Referring now to FIG. 3, an apparatus for determining geolocation estimates for an emitter that is beyond the LOS (i.e., over the horizon) relative to at least two receiving stations is provided. The apparatus may be an embodiment of the geolocation engine 50 or a device hosting the geolocation engine 50. As such, configuration of the apparatus as described herein may transform the apparatus into the geolocation engine 50, or into a device capable of performing location estimates for the emitter 40 as described herein. In an example embodiment, the apparatus may include or otherwise be in communication with processing circuitry 100 that is configured to perform data processing, application execution and other processing and management services according to an example embodiment of the present invention. In one embodiment, the processing circuitry 100 may include a storage device 112 and a processor 110 that may be in communication with or otherwise control a user interface 120 and a device interface 130. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of a server, computer, laptop, workstation or even one of various mobile computing devices. In situations where the processing circuitry 100 is embodied as a server or at a remotely located computing device, the user interface 120 may be disposed at another device (e.g., at a computer terminal or other client device) that may be in communication with the processing circuitry 100 via the device interface 130 and/or a network.

The user interface 120 may be in communication with the processing circuitry 100 to receive an indication of a user input at the user interface 120 and/or to provide an audible, visual, mechanical or other output to the user. As such, the user interface 120 may include, for example, a keyboard, a mouse, a joystick, a display, a touch screen, a microphone, a speaker, or other input/output mechanisms. In embodiments where the apparatus is embodied at a server or other network entity, the user interface 120 may be limited or even eliminated in some cases. Alternatively, as indicated above, the user interface 120 may be remotely located. In any case, the user interface 120 may provide the user with the ability to make selections (e.g., such as selecting a platform of interest, which may be used to determine the altitude of the emitter 40) to allow the user to interact with the geolocation engine 50 to provide, modify or select input data. Alternatively or additionally, the user may make selections via the user interface 120 to make selections impacting the output of the geolocation engine 50.

The device interface 130 may include one or more interface mechanisms for enabling communication with other devices and/or networks. In some cases, the device interface 130 may be any means such as a device or circuitry embodied in either hardware, software, or a combination of hardware and software that is configured to receive and/or transmit data from/to a network and/or any other device or module in communication with the processing circuitry 100. In this regard, the device interface 130 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 120 communicates with a network or devices in the network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 112 may include one or more non-transitory storage or memory devices such as, for example, volatile and/or non-volatile memory that may be either fixed or removable. The storage device 112 may be configured to store information, data, applications, instructions or the like for enabling the apparatus to carry out various functions in accordance with example embodiments of the present invention. For example, the storage device 112 could be configured to buffer input data for processing by the processor 110. Additionally or alternatively, the storage device 112 could be configured to store instructions for execution by the processor 110. As yet another alternative, the storage device 112 may include one of a plurality of databases that may store a variety of files, contents or data sets. Among the contents of the storage device 112, applications may be stored for execution by the processor 110 in order to carry out the functionality associated with each respective application. In an example embodiment, the storage device 112 may store a first analytical model of the ionosphere 150 and a second analytical model of the ionosphere 160. The second analytical model of the ionosphere 160 may be a portion of, or used in connection with, a ray tracer 170, as described herein.

The processor 110 may be embodied in a number of different ways. For example, the processor 110 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 110 may be configured to execute instructions stored in the storage device 112 or otherwise accessible to the processor 110. As such, whether configured by hardware or software methods, or by a combination thereof, the processor 110 may represent an entity (e.g., physically embodied in circuitry) capable of performing operations according to embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 to perform the operations described herein.

In an example embodiment, the processor 110 (or the processing circuitry 100) may be embodied as, include or otherwise control the geolocation engine 50, which may be any means such as a device or circuitry operating in accordance with software or otherwise embodied in hardware or a combination of hardware and software (e.g., processor 110 operating under software control, the processor 110 embodied as an ASIC or FPGA specifically configured to perform the operations described herein, or a combination thereof) thereby configuring the device or circuitry to perform the corresponding functions of the geolocation engine 50 as described below.

The geolocation engine 50 may include tools to facilitate the employment of a geolocation algorithm that determines an estimated location of the emitter 40 based on the assumption that received signals at the first and second platforms 20 and 30 are sky waves 42, and based on TDOA and FDOA measurements and analysis as described herein. The geolocation engine 50 may be any means such as a device or circuitry operating in accordance with software or otherwise embodied in hardware or a combination of hardware and software (e.g., processor 110 operating under software control, the processor 110 embodied as an ASIC or FPGA specifically configured to perform the operations described herein, or a combination thereof) thereby configuring the device or circuitry to perform the corresponding functions of the geolocation engine 50 and/or any modules thereof, as described herein.

In an example embodiment, the ray tracer 170 may also be any means such as a device or circuitry operating in accordance with software or otherwise embodied in hardware or a combination of hardware and software (e.g., processor 110 operating under software control, the processor 110 embodied as an ASIC or FPGA specifically configured to perform the operations described herein, or a combination thereof) thereby configuring the device or circuitry to perform the corresponding functions of the ray tracer 170 as described below. The ray tracer 170 may utilize the second analytical model 160 to compute TDOA/FDOA maps based on the TDOA/FDOA measurements to estimate location of the emitter 40.

Figure 4:
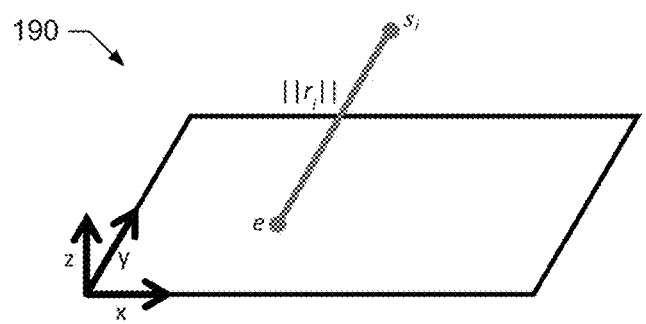
FIG. 4 illustrates a first model corresponding to a traditional LOS situation for understanding relative to developing an analytical model according to an example embodiment.

An example embodiment will now be described in general terms in relation to the development of the first analytical model of the ionosphere 150 and the ray tracer 170 of FIG. 3. For reference, first consider the traditional LOS situation. Consider an airborne sensor, $\vec{s}_i$, and emitter, $\vec{e}$, at known positions. If it is assumed that the emitter is fixed to the plane of the flat Earth, but the sensors may be at arbitrary altitude, the traditional LOS situation may be represented in the model 190 of FIG. 4. From this simple model the time-of-flight (TOF) of a signal from the emitter to the sensor can be found immediately as:

$$TOF_i = \frac{\|\vec{r}_i\|}{c}. \tag{1.1}$$

The TDOA between receivers i and j is then $$TDOA_{i,j} = TOF_i - TOF_j = \frac{\|\vec{r}_i\| - \|\vec{r}_j\|}{c}. \tag{1.2}$$

The Doppler shift due to the motion of the receiver is $$D_i = (\vec{u}_i^T \vec{v}_I) \frac{f}{c} = ((\vec{e} - \vec{s}_i)^T \vec{v}_I) \frac{f}{c} \tag{1.3}$$

where $\vec{u}_n$ is the unit vector from the sensor to the emitter and $\vec{v}_I$ is the velocity of the receiver.

The FDOA between two receivers is then $$FDOA_{i,j} = D_i - D_j = (\vec{u}_i^T \vec{v}_I - \vec{u}_j^T \vec{v}_J) \frac{f}{c}. \tag{1.4}$$

Next, the TOF of a signal which "bounces" off the ionosphere may be considered. The ionospheric refraction may be modeled as a perfect reflection from some effective height. For now, consider the flat Earth case with a flat ionosphere at a height h above the plane of the Earth and consider the receivers to be located on the ground as shown in model 192 of FIG. 5.

Figure 5:
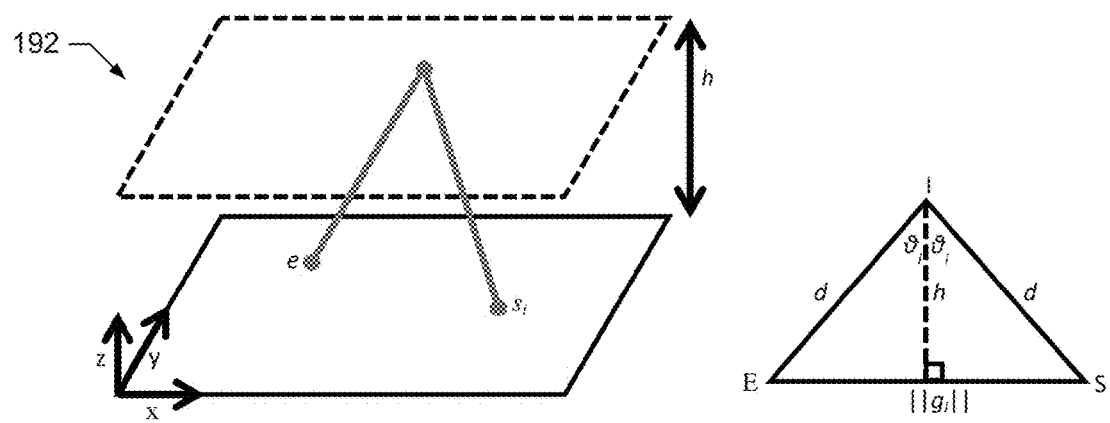
FIG. 5 illustrates a second model corresponding to a flat Earth, single bounce case with ground receivers for understanding relative to developing an analytical model according to an example embodiment.

In reference to the model 192 of FIG. 5, there is a high degree of symmetry and the TOF is twice the distance d, i.e.

$$TOF_i = \frac{2\sqrt{\left(\frac{\|\vec{g}_i\|}{2}\right)^2 + h^2}}{c} = \frac{\sqrt{\|\vec{g}_i\|^2 + 4h^2}}{c}. \tag{1.5}$$

To compute the Doppler shift in the non-line-of-sight (NLOS) case, the vector $\vec{u}_i$ will be replaced with a unit vector along the path of signal propagation as it reaches the receiver. In this case, that is along the line segment IS.

$$D_i = (\vec{u}_i^T \vec{v}_I) \frac{f}{c} = ((\vec{l} - \vec{s}_i)^T \vec{v}_I) \frac{f}{c}. \tag{1.6}$$

Figure 6:
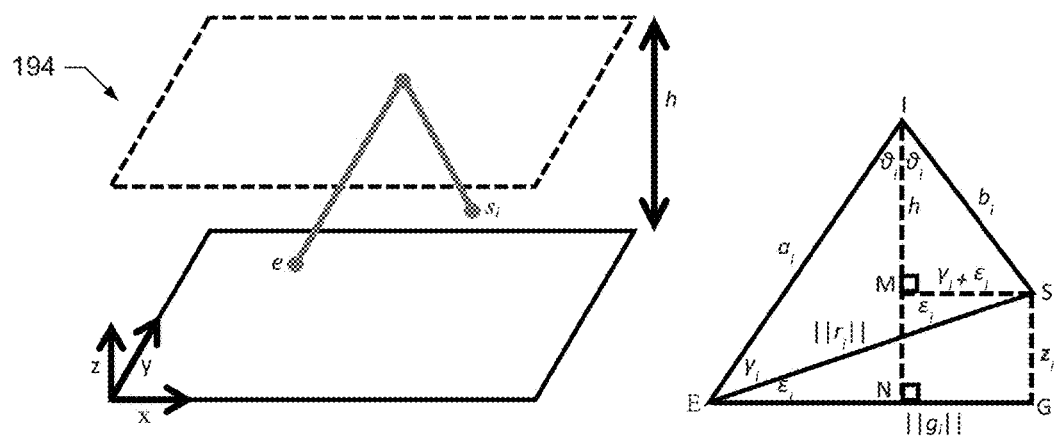
FIG. 6 illustrates a third model corresponding to a flat Earth, single bounce case with airborne receivers for understanding relative to developing an analytical model according to an example embodiment.

If the receivers are not constrained to be in the plane of the Earth, the model changes slightly. In this regard, FIG. 6 illustrates a model 194 in which a flat Earth is assumed, and airborne receivers experience a single bound TOF. Referring to FIG. 6, the laws of trigonometry can be applied to solve for the distances $a_i$ and $b_i$ which can be used to determine the TOF between the emitter and sensor (i.e. distance $\overline{EIS}$). First, observe that triangles INE and IMS are similar, so that $$\frac{a_i}{b_i} = \frac{h}{h - z_i}. \tag{1.7}$$

Triangle SGE gives an equation to determine $\varepsilon_i$, $$\sin\varepsilon_i = \frac{z_i}{\|\vec{r}_i\|}, \tag{1.8}$$

using the knowledge Euclidean distance between the emitter and sensor $\|\vec{r}_i\|$ and the sensor altitude $z_i$.

Considering triangle EIS, summing the angles and applying the laws of cosine and sine, we find, $$\gamma_i + 2\theta_i + \gamma_i + 2\varepsilon_i = 180° = \pi, \tag{1.9}$$

$$\|\vec{r}_i\|^2 = a_i^2 + b_i^2 - 2a_i b_i \cos 2\theta_i, \text{ and} \tag{1.10}$$

$$\frac{\sin(\gamma_i + 2\varepsilon_i)}{a_i} = \frac{\sin\gamma_i}{b_i} = \frac{\sin 2\theta_i}{\|\vec{r}_i\|}. \tag{1.11}$$

Combining (1.7), (1.11) and $\varepsilon_i$ from (1.8) we obtain $$\tan\gamma_i = \frac{\sin 2\varepsilon_i}{\frac{h}{h - z_i} - \cos 2\varepsilon_i}, \tag{1.12}$$

when $z_i \neq 0$. If $z_i = 0$ then $$\tan \gamma_i = \frac{h_i}{\|\vec{r}_i\|/2}. \quad (1.13)$$

The angle $\theta_i$ can now be determined as $\theta_i = 90° - \gamma_i - \varepsilon_i = \pi/2 - \gamma_i - \varepsilon_i$. Finally, (1.11) can be solved for $a_i$ and $b_i$, i.e.

$$a_i = \|\vec{r}_i\| \frac{\sin(\gamma_i + 2\varepsilon_i)}{\sin 2\theta_i}, \quad (1.14)$$

$$b_i = \|\vec{r}_i\| \frac{\sin \gamma_i}{\sin 2\theta_i}. \quad (1.15)$$

Equation (1.10) can be used as a consistency check.
The TOF is simply $$TOF_i = \frac{a_i + b_i}{c}. \quad (1.16)$$

The Doppler shift can be computed exactly as in equation (1.6), by substituting the new coordinates for the bounce point I.

Figure 7:
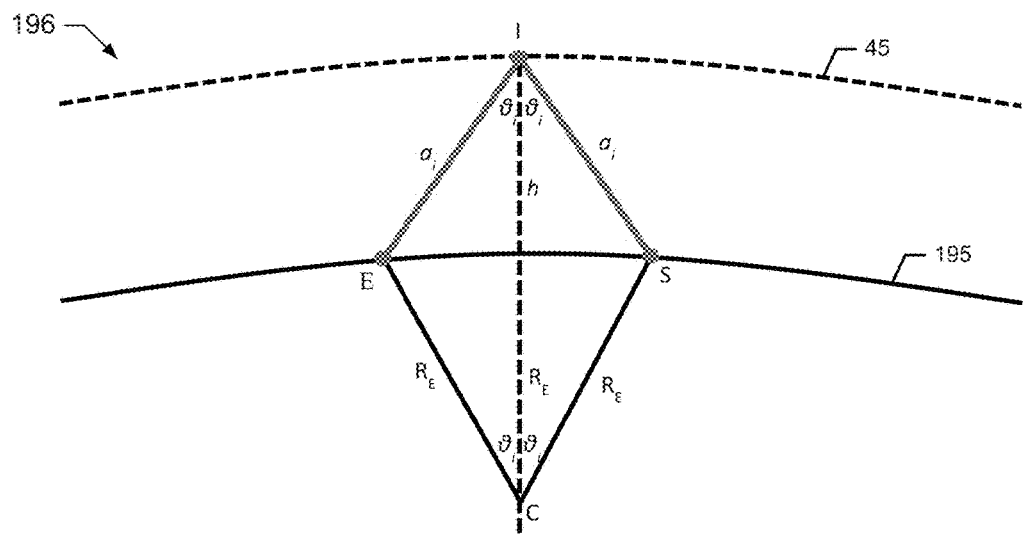
FIG. 7 illustrates a fourth model corresponding to a spherical Earth, single bounce case with ground receivers for understanding relative to developing an analytical model according to an example embodiment.

A subsequent iteration of the analytical model introduces a spherical Earth 195 and spherical ionosphere surface 45, where the receivers are assumed initially to be on the surface of the Earth. The radius of the Earth is known, $R_E \approx 6371.0$ km, and it is assumed that the ionosphere is a perfect reflecting surface at an additional radial distance h from the surface of the Earth as shown in FIG. 7. Referring to FIG. 7, model 196 shows that the angle $\varphi_i$ is given by $$\varphi_i = \frac{g_i}{2R_E} \text{(rad)} \quad (1.17)$$

in which $g_i$ is the great circle distance (ground distance) between the emitter and the sensor. Applying the law of cosines to the triangle ICE yields $$a_i = \sqrt{R_E^2 + (R_E + h)^2 - 2R_E(R_E + h)\cos \varphi_i} \quad (1.18)$$

and the total TOF is $2a_1$.

As in the previous case, the Doppler shift can be computed exactly as in equation (1.6), by substituting the new coordinates for the bounce point I.

Figure 8:
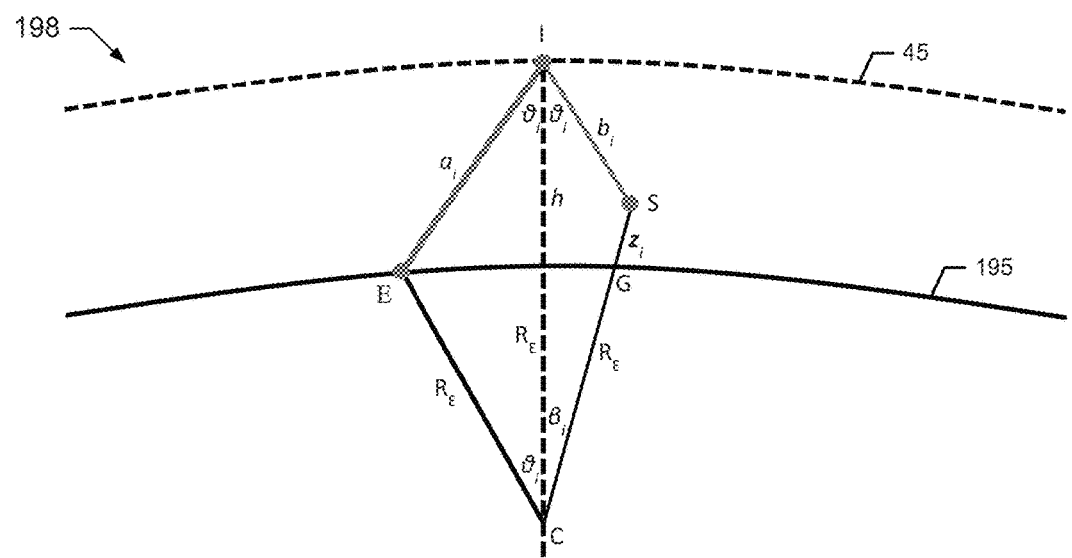
FIG. 8 illustrates a third model corresponding to a spherical Earth, single bounce case with airborne receivers for understanding relative to developing an analytical model according to an example embodiment.

FIG. 8 illustrates a further model 198 in which the receivers are not constrained to being on the ground. The model 198 again includes a spherical Earth 195 and ionosphere 45, but, as stated above, does not constrain the receivers to be on the ground. As in the previous cases, the emitter location (E) is assumed to be known and on the surface of the Earth. From the emitter and receiver locations, the great circle distance between them, $g_i$, and the Euclidean distance between them, $\|\vec{r}_i\|$ can be computed.

For receiver position specified by latitude, longitude, and altitude, the Euclidean distance between the emitter and receiver is not trivial. It can be determined by applying the law of cosines on the triangle CES, $$\|\vec{r}_i\| = \sqrt{R_E^2 + (R_E + z_i)^2 - 2R_E(R_E + z_i)\cos(\alpha_i + \beta_i)} \quad (1.19)$$

$$= \sqrt{R_E^2 + (R_E + z_i)^2 - 2R_E(R_E + z_i)\cos(g_i + R_E)}.$$

Applying the law of cosines on triangle ICE yields $$R_E^2 = (R_E + h)^2 + a_i^2 - 2(R_E + h)a_i \cos \theta_i \quad (1.20)$$

which implies $$a_i = (R_E + h)\cos \theta_i \pm \sqrt{(R_E + h)^2(\cos^2 \theta_i - 1) + R_E^2}. \quad (1.21)$$

Similarly, the law of cosines on triangle ICE implies $$b_i = (R_E + h)\cos \theta_i \pm \sqrt{(R_E + h)^2(\cos^2 \theta_i - 1) + (R_E + z_i)^2}. \quad (1.22)$$

And the law of cosines on IES yields $$\|\vec{r}_i\|^2 = a_i^2 + b_i^2 - 2a_i b_i \cos 2\theta_i. \quad (1.23)$$

Observe that the only unknown quantity in equations (1.21) and (1.22) is $\theta_i$. It is not possible to obtain a closed form expression for $\theta_i$, however, we can solve numerically for that angle by choosing some values and plugging them into equations (1.21) and (1.22) and then into (1.23). The branch cuts ($\pm\sqrt{}$) can be decided by checking each choice (bad choices lead to nonsensical answers). A bisection search can then be used to refine the value of $\theta_i$ and the resulting distances $a_i$ and $b_i$. Thus, the model 198 of FIG. 8 may be one example of the application of the first analytical model of the ionosphere 150 mentioned above in reference to FIG. 3. As in the previous case, the Doppler shift can be computed exactly as in equation (1.6), by substituting the new coordinates for the bounce point I. Other perturbations of the model 198 may be made to consider altitude of the emitter (E) at an assumed value.

The ray tracer 170, may be a numerical ray-tracer capable of simulating the path and properties of high-frequency radio signals traveling through the ionosphere. By employing the ray tracer 170, the geolocation engine 50 may be capable of tracing thousands of signals in less than ten seconds, and may enable the geolocation engine 50 to create high-resolution TOF maps and Doppler Shift maps, which can then be translated into TDOA/FDOA maps respectively and finally to geolocation probability maps. Some of the governing equations and assumptions that form the foundation for the ray tracer 170 and some of its capabilities will be discussed herein.

The base assumption that allows the ray tracer 170 to function is that the medium is continuous and slowly varying with respect to the wavelength of the signal. This assumption sometimes fails, such as in the case of ionospheric scintillation, but in general, the ionosphere can be considered to be a well-behaved medium for high-frequency signals (3-30 MHz). To calculate a ray path, a Hamiltonian may be defined as:

$$H = \frac{1}{2} \text{Re}\left\{ \frac{c^2}{\omega^2} \|v\|_2^2 - \mu^2 \right\} \quad (3.20)$$

where (u, v) are the position and direction vectors of the signal, $\mu = \mu(u, v)$ is the refractive index of the ionosphere, c is the speed of light, and $\omega$ is the center angular frequency of the signal. The traditional Appleton-Hartree equation may then be used to calculate the refractive index of the ionosphere where $$\mu^2 = 1 - \frac{X}{1 - iZ + iY\rho\cos\theta}. \quad (3.21)$$

In this example, θ is the angle between v and the surrounding magnetic field, ρ describes the polarization of the signal and ρ=ρ(X, Y, Z), X is the square ratio of the electron plasma frequency to the center frequency of the signal, Y is the ratio of the electron gyro frequency to the center frequency, and finally Z is the ratio of the electron collision frequency to the center frequency. One can think of them in a more general sense by noting that X is the contribution of the electron density, Y is the contribution of the magnetic field, and Z is the contribution of collisions.

Following the normal Hamiltonian construction, along a continuous ray path, the following equations hold true.

$$\frac{\partial u}{\partial t} = \frac{\partial H}{\partial v}, \text{ and}$$

$$\frac{\partial v}{\partial t} = -\frac{\partial H}{\partial v}. \quad (3.22)$$

Thus, given the state of the ionosphere and magnetosphere used to calculate the refractive index, it is possible to "step" forward in time by using current state information. That is, integration can be performed along a known ray-path to calculate the current position and direction of a signal. Numerically, the integration is accomplished via a variety of quadrature rules (user's choice). The default quadrature rule may be the Runge-Kutta Dormand-Prince (RKDP) method. This explicit ordinary differential equation (ODE) solver combines a fourth and fifth order method to estimate the error at any time. Knowing the error at the current time, allows for dynamic changes to the step size. RKDP is the method utilized by MATLAB in their standard explicit solver, ode45( ).

In addition to the complicated and diverse possible paths HF signals can trace through the ionosphere, another complicating factor, when calculating TOF and Doppler shifts of sky waves, is that the ionosphere will slow down the signal and shift the center frequency of the signal with various degrees of severity depending on the electron content. Let T be the total time of flight of a signal and $f_c$ be the center frequency of the signal, then $$\frac{\partial T}{\partial t} = 1 + \frac{f_c}{\mu} \frac{\partial \mu}{\partial f_c}. \quad (3.23)$$

The larger electron density value results in smaller the refractive index values, µ, and thus the signal will have a larger total time of flight. Total time of flight is calculated with the same quadrature rule as the position and direction vectors while propagating a ray forward in time. To calculate the Doppler shift of the ionosphere we need to look at the frequency shift of the Hamiltonian. Using ω to represent the center angular frequency of our signal, we find that $$\frac{\partial \omega}{\partial t} = -\frac{\partial H}{\partial t}. \quad (3.24)$$

Now this Doppler shift is only the component of the total Doppler shift due to the change in ionosphere over time. Two additional components, the contribution of the moving receiver and the contribution of a moving emitter, will produce additional Doppler shifts. For the purposes here, the case of moving emitters is not considered. Rather, the Doppler shift due to the time gradient of the ionosphere and the Doppler shift due to a moving receiver is all that is considered.

The computational requirements to step each ray forward in time are rather minimal Additionally, the ray tracer 170 is configured to compute each ray-path independently, i.e. it is assumed that the signals do not interact in any meaningful way (note that this assumption does not always hold true). The minimal computational requirements and independence of the paths allow for highly parallel implementation, which can be taken advantage of by utilizing the massive parallel processing power of graphics processors and the CUDA programming language in some embodiments. This parallel capability may enable the creation of high-resolution TOF maps in a matter of seconds/minutes (depending on desired accuracy).

Once the ray tracer 170 numerically calculates TDOA/FDOA maps from each possible pair of receivers, based on a more accurate model (i.e., the second analytical model 160), the next step is to combine the refined TDOA/FDOA results to estimate a more accurate geolocation. The final step refines the first geolocation estimate using the results of the ray tracer 170, which provides highly accurate analytical TDOA maps. Thus, for example, the geolocation engine 50 can be said to perform a geolocation algorithm. The geolocation algorithm, which is summarized in the block diagram of FIG. 9.

Figure 9:
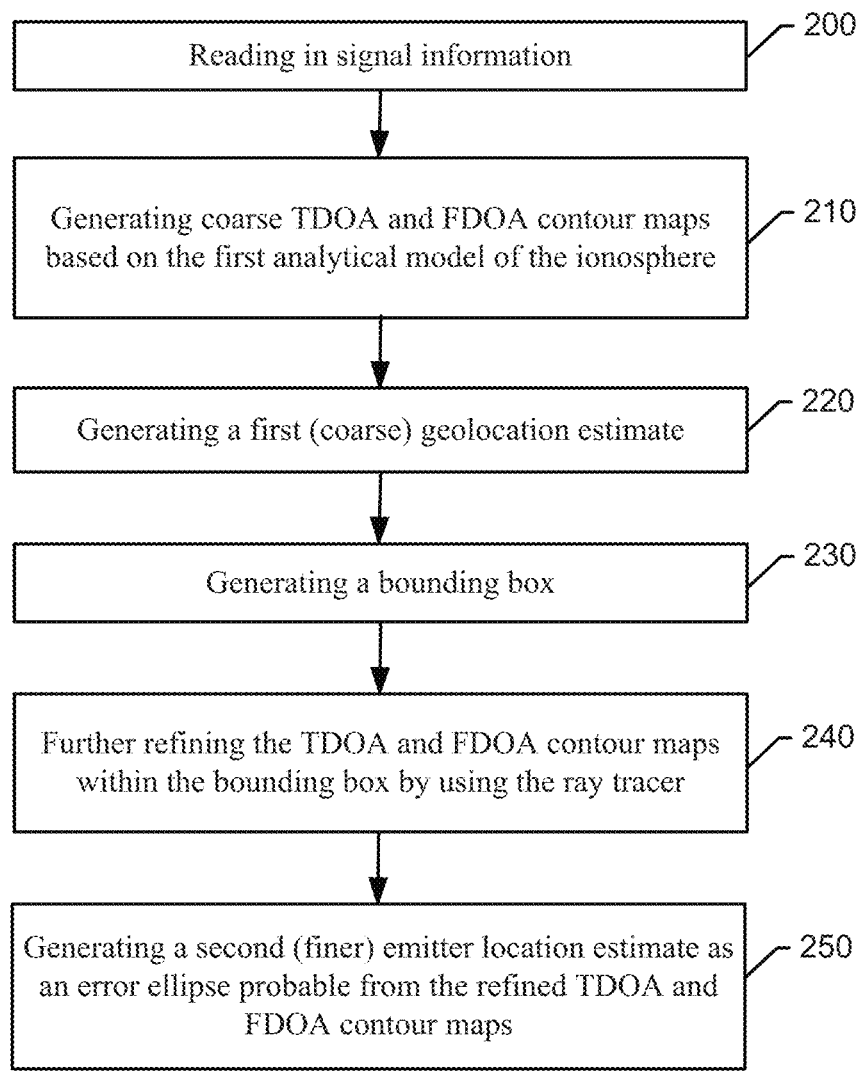
FIG. 9 is a block diagram of various operations associated with performance of a geolocation algorithm according to an example embodiment.

From a technical perspective, the geolocation engine 50 described above may be used to support some or all of the operations described above. As such, the platform described in FIG. 3 may be used to facilitate the implementation of several computer program and/or network communication based interactions. As an example, FIG. 9 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one example embodiment is shown in FIG. 9. The method may include reading in signal information (e.g., TDOA, FDOA, frequency, polarization, etc.) at operation 200. At operation 210, coarse TDOA and FDOA contour maps may be generated based on the first analytical model of the ionosphere 150. These course TDOA and FDOA contour maps may be used to generate a first (e.g., coarse) geolocation estimate at operation 220. The coarse geolocation estimate may be used to generate a bounding box at operation 230. Of note, the bounding box need not necessarily be rectangular and could have any shape. However, in some examples, the bounding box could be about one degree in latitude and longitude in size, thereby creating the box shape. The bounding box may enclose the true emitter location with a relatively high level of confidence based on the first analytical model of the ionosphere 150-generated estimate. The bounding box may generally be expected to be large, but may be much smaller than all possible emitter locations. At operation 240, the TDOA and FDOA contour maps may be further refined within the bounding box by using the ray tracer 170. The ray tracer 170 may provide higher fidelity estimates of the signal paths and therefore may refine the TDOA/FDOA contours for the possible emitter locations on a dense grid. At operation 250, the emitter location estimate may be further improved to create an error ellipse probable from the refined TDOA and FDOA contour maps.

Of note, the method of FIG. 9 may be considered to be a comprehensive operation that may not necessarily need to be fully completed in all cases. In this regard, for example, the generation of the first (coarse) geolocation estimate may be the ultimate goal in some cases (e.g., where processing capabilities are limited, or the identification of a potentially larger search area in a short time is the goal instead of determining an accurate location estimate). Thus, one example method may include only operations 200 to 210, and other operations may be optional or excluded entirely. Furthermore, in some embodiments, the generation of a first geolocation estimate may be performed by another method, and the user may start with an initial geolocation estimate (by any method) and then perform operations 240 and 250 relative to the initial geolocation estimate to identify a finer emitter location estimate.

In an example embodiment, an apparatus for performing the method of FIG. 9 above may comprise a processor (e.g., the processor 110) or processing circuitry 100 configured to perform some or each of the operations (200-250) described above. The processor may, for example, be configured to perform the operations (200-250) by performing hardware implemented logical functions, executing stored instructions, or executing algorithms for performing each of the operations. In some embodiments, the processor or processing circuitry may be further configured for additional operations or optional modifications to operations 200 to 250, or perform a subset of such operations. As a result, a geolocation probability map, or heat map, may be generated from TDOA and FDOA contour maps, and contours drawn on such maps.

The separate TDOA contours may be combined to determine the geolocation probabilities by, for example, assuming that each measurement (TDOA or FDOA) is a sample from a normal distribution with a mean of the given value and some standard deviation that may be provided, for example, by other calculations. Let $d_{ij}(t; \mu_{ij}, \sigma_{ij})$ be the probability density function (pdf) for receiver pair (i,j). That is $$d_{ij}(t; \mu_{ij}, \sigma_{ij}) = \frac{1}{\sigma_{ij}\sqrt{2\pi}} \exp\left(\frac{-(t-\mu_{ij})^2}{2\sigma_{ij}^2}\right) \quad (3.25)$$

Now both the first and second analytical models 150 and 160 (e.g., the analytical estimate and the numeric refinement) provide measurement maps. That is, given a longitude and latitude it is possible to calculate the measurement (TDOA or FDOA) at the point. Let $T_{ij}(x, y)$ be the measurement for receiver pair (i,j) at the latitude/longitude point, (x, y). To create the geolocation probability, two functions may be composed. For example, let $p_{ij}(x,y; \mu_{ij}, \sigma_{ij})$ be the probability density function (pdf) of geolocation at latitude/longitude point, (x, y). Then $$p_{ij}(x, y; \mu_{ij}, \sigma_{ij}) = d_{ij}(T_{ij}(x, y); \mu_{ij}, \sigma_{ij}) \quad (3.26)$$

$$= \frac{1}{\sigma_{ij}\sqrt{2\pi}} \exp\left(\frac{-(T_{ij}(x, y) - \mu\_ij)^2}{2\sigma_{ij}^2}\right) * \frac{1}{Z_{ij}}$$

where $Z_{ij}$ is the necessary normalization factor. To create the total geolocation pdf, all $P_{ij}$ must be combined. The method for combining these pdfs follows the so-called Generalized Hough Transform. Let S be the set of all possible combination of receiver pairs. Let K be the number of members of S, and let $S_k$ denote the kth subset of S. Then $$P(x, y) = \frac{1}{Z}\sum \alpha_{ij} * p_{ij}(x, y; \mu_{ij}, \sigma_{ij}) \quad (3.27)$$

for some weights $\alpha_{ij}$ and normalization factor Z. This pdf combination approach is particularly useful because disparate measurements can be combined in a straightforward way by first converting them into a pdf of the likely emitter location.

Figure 10:
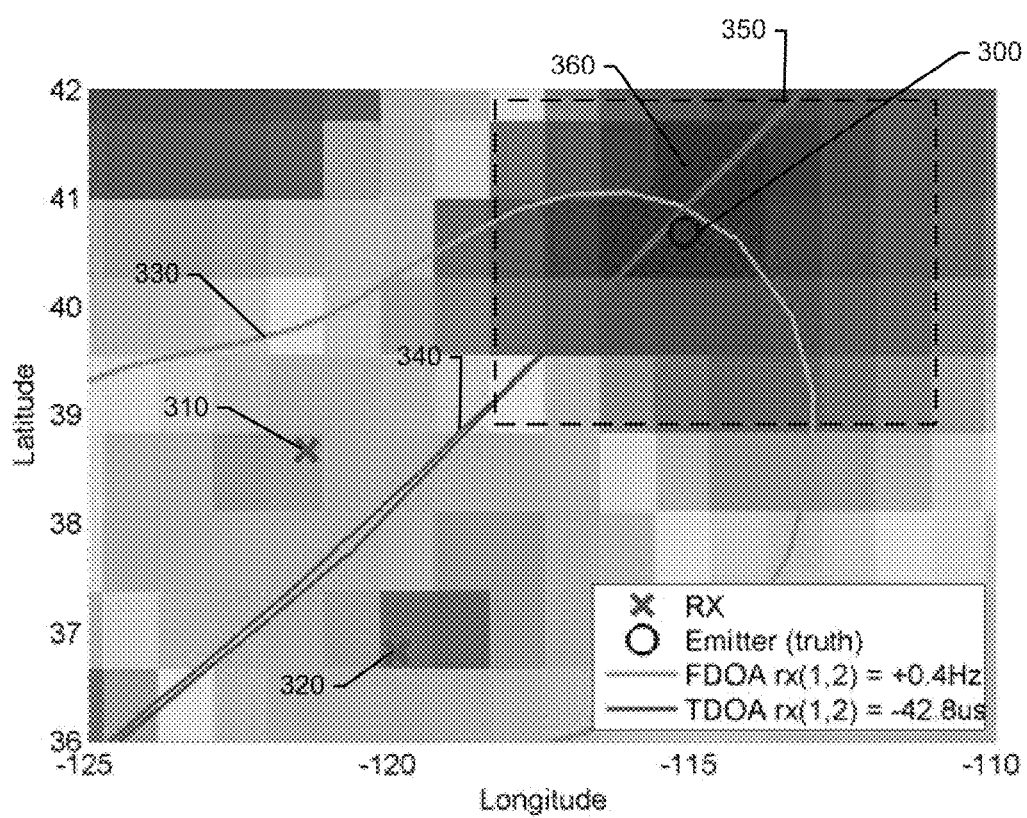
FIG. 10 illustrates an example of an analytical estimate of geolocation using a probability heat map in accordance with an example embodiment.

FIG. 10 illustrates an example geolocation estimate in accordance with an example embodiment. FIG. 10 is essentially a "heat map" showing the probability of emitter location. Actual emitter location 300 is shown, and is in the "hottest" part of the geolocation estimate. RX 1 location 310 and RX 2 location 320 are shown along with an FDOA contour line 330 and a TDOA contour line 340 generated in accordance with the techniques described above. The area around the intersection of the FDOA contour line 330 and the TDOA contour line 340 has the highest probability of containing the actual emitter location 300. Meanwhile, areas near the receivers, and in the top left of the probability heat map of FIG. 10 show a very low probability of containing the actual emitter location 300. In some cases, the bounding box 350 may be shown after the initial estimate of emitter location is determined. Thereafter, an error ellipse 360 may be generated when the geolocation estimate is refined as described above.

One advantage that may be provided by some example embodiments is that a single antenna on each of as few as two different receivers may be used to obtain a relatively accurate representation of estimated emitter location for a target that is beyond LOS when the target is an HF emitter. The known locations of the receivers, along with a consistent time reference to allow TDOA and FDOA measurements to be reconciled with each other, may enable the TDOA and FDOA measurements to be used in connection with corresponding models of the ionosphere to generate contour lines that will intersect and define high probability estimates for the location of the emitter.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus comprising processing circuitry configured to estimate beyond line-of-sight emitter location by:
   receiving signal information indicative of time difference of arrival (TDOA) and frequency difference of arrival (FDOA) measurements at a first receiver and a second receiver, the signal information being generated based on indirect wave signals received from the emitter at each of the first and second receivers;
   employing a first analytical model of the ionosphere to generate coarse TDOA and FDOA contour maps; and
   generating a first geolocation estimate based on the coarse TDOA and FDOA contour maps.

2. The apparatus of claim 1, wherein the processing circuitry is further configured to generate a bounding box defining an area of high probability for including actual emitter location based on the first geolocation estimate.

3. The apparatus of claim 2, wherein the bounding box is approximately one degree of latitude and longitude in size.

4. The apparatus of claim 1, wherein the processing circuitry is further configured to employ a ray tracer to further refine the coarse TDOA and FDOA contour maps, the ray tracer employing a second analytical model of the ionoshpere.

5. The apparatus of claim 4, wherein the second analytical model of the ionosphere is more accurate than the first analytical model of the ionosphere.

6. The apparatus of claim 4, wherein the processing circuitry is further configured to generate a second geolocation estimate based on operation of the ray tracer.

7. The apparatus of claim 6, wherein the second geolocation estimate comprises an error ellipse generated based on an intersection of a TDOA contour line and an FDOA contour line from refined TDOA and FDOA contour maps.

8. The apparatus of claim 1, wherein the apparatus is disposed at one of a first platform on which the first receiver is located, or a second platform on which the second receiver is located.

9. The apparatus of claim 1, wherein the apparatus is disposed at an entity in wireless communication with a first platform on which the first receiver is located and a second platform on which the second receiver is located, the entity being configured to generate the first location estimate substantially in real time after receiving the signal information.

10. An apparatus comprising processing circuitry configured to estimate beyond line-of-sight emitter location by:
    receiving a coarse geolocation estimate of emitter location based on indirect wave signals received from the emitter at each of a first receiver and a second receiver;
    employing a ray tracer to further refine the coarse geolocation estimate of emitter location, the ray tracer employing an analytical model of the ionosphere, and the ray tracer comprising numerical ray tracer configured to simulate path and properties of high-frequency radio signals traveling through the ionosphere; and
    generating a finer geolocation estimate based on operation of the ray tracer,
    wherein the processing circuitry is configured to perform the coarse geolocation estimate by:
    receiving signal information indicative of time difference of arrival (TDOA) and frequency difference of arrival (FDOA) measurements at the first and second receivers;
    employing another analytical model of the ionosphere to generate coarse TDOA and FDOA contour maps; and
    generating the coarse geolocation estimate based on the coarse TDOA and FDOA contour maps.

11. The apparatus of claim 10, wherein the processing circuitry is further configured to generate a bounding box defining an area of high probability for including actual emitter location based on the coarse geolocation estimate.

12. The apparatus of claim 11, wherein the bounding box is approximately one degree of latitude and longitude in size.

13. The apparatus of claim 10, wherein the analytical model of the ray tracer is more accurate than the analytical model employed for the coarse geolocation estimate.

14. The apparatus of claim 13, wherein the finer geolocation estimate comprises an error ellipse generated based on an intersection of a TDOA contour line and an FDOA contour line from refined TDOA and FDOA contour maps.

15. The apparatus of claim 10, wherein the apparatus is disposed at one of a first platform on which the first receiver is located, or a second platform on which the second receiver is located.

16. The apparatus of claim 10, wherein the apparatus is disposed at an entity in wireless communication with a first platform on which the first receiver is located and a second platform on which the second receiver is located, the entity being configured to generate the first location estimate substantially in real time after receiving the signal information.

17. An apparatus comprising processing circuitry configured to estimate beyond line-of-sight emitter location by:
   receiving signal information indicative of time difference of arrival (TDOA) and frequency difference of arrival (FDOA) measurements at a first receiver and a second receiver, the signal information being generated based on indirect wave signals received from the emitter at each of the first and second receivers;
   employing a first analytical model of the ionosphere to generate coarse TDOA and FDOA contour maps;
   generating a first geolocation estimate based on the coarse TDOA and FDOA contour maps;
   employing a ray tracer to further refine the coarse TDOA and FDOA contour maps, the ray tracer employing a second analytical model of the ionosphere; and
   generating a second geolocation estimate based on operation of the ray tracer.

18. The apparatus of claim 17, wherein the processing circuitry is further configured to generate a bounding box defining an area of high probability for including actual emitter location based on the first geolocation estimate, and wherein the ray tracer operates relative to the bounding box.

19. The apparatus of claim 17, wherein the second analytical model of the ionosphere is more accurate than the first analytical model of the ionosphere.

* * * * *